United States Patent

Weidanz

[15] 3,645,393

[45] Feb. 29, 1972

[54] DEVICE FOR SELECTING INDEX CARDS OF SHEETLIKE FORM

[72] Inventor: Herbert Weidanz, Odenthal-Globusch, Germany

[73] Assignee: Datagraph AG, Zug, Switzerland

[22] Filed: Mar. 12, 1970

[21] Appl. No.: 18,950

[30] Foreign Application Priority Data

Apr. 19, 1969 Germany ....................... P 19 19 924.7

[52] U.S. Cl. .......................... 209/80.5, 209/110.5, 271/62 B, 271/87

[51] Int. Cl. .......................... B07c 5/00

[58] Field of Search .......................... 209/80.5, 110.5; 271/62 B, 271/87

[56] References Cited

UNITED STATES PATENTS

| | | | |
|---|---|---|---|
| 2,232,721 | 2/1941 | Novick | 271/82 X |
| 1,586,544 | 6/1926 | White | 93/93 |

*Primary Examiner*—Allen N. Knowles
*Assistant Examiner*—Gene A. Church
*Attorney*—Milton Robert Kestenbaum

[57] ABSTRACT

A plurality of fingers are arranged at acute angles to both sides of a stack of index cards which are releasably suspended along their upper edges from supporting and guiding rails. The index cards can be selected from the stack, moved to a using station and returned to the end of the stack. The fingers can be moved into the stack in the direction of movement of the stack so as to divide the stack into smaller individual stacks and to impart a uniform direction of movement to the stack.

12 Claims, 4 Drawing Figures

INVENTOR.
HERBERT WEIDANZ
BY [signature]

DEVICE FOR SELECTING INDEX CARDS OF SHEETLIKE FORM

The invention relates to a device for selecting index cards of sheetlike form from a stack of index cards, said device comprising a tab extending along an edge of the index card, a rail device from which the tabs are suspended and along which they are slidably guided similar to a suspension file, a first selecting and transporting arrangement by means of which each index card can be selected from the stack and removed therefrom, and a second transporting arrangement by means of which the index card can be moved towards a reading station, writing station, checking station or the like and can be transported therefrom towards one end of the stack on the rail device and by means of which the stack can be moved in the direction of the other end by at least the thickness of one index card.

Such a storage medium is described in the earlier U.S. Pat. No. 3,530,985 which copended herewith. It has the advantage that its index card can be definitely selected from the stack. It has the further advantage that the selected index card does not have to be moved back to its previous position, but can be fed into this stack again at one end. In addition, it has the advantage of random access storage.

If the individual index cards are light in weight an embodiment comprising a stack of 1000 index cards can weigh 20 kp. In the case of larger stacks it is therefore unavoidable that, particularly at one end of the stack, pressure occurs which makes a selection of index cards practically impossible and particularly if the first selecting and transporting arrangement consists of components of large dimensions. Surface roughness, static charging, cutting of the edges, perforations, the pressure or the like between the index cards are increased by the disadvantageous effects of pressure.

With the storage medium mentioned at the beginning it is utterly impossible for the stack to be manually divided into sections, to be suspended from the rail device in an inclined position, to be leafed through etc., because the storage medium is fully automatic and operates at high speed.

It is also impossible to provide vibrating or tapping devices for loosening the stack since this would cause intense vibrations and noise, in which case it is necessary to bear in mind that the weight of the stack alone is of the same order as that of the storage device.

The problem underlying the invention is to provide a device which eliminates the above-mentioned disadvantages and makes it possible to divide the stack simply, noiselessly and evenly into smaller individual stacks, and, at the same time, to impart to the stack a uniform direction of movement.

This problem is solved in accordance with the invention in that there is provided a plurality of fingers which, when seen in the direction of movement of the stack, are arranged at acute angles thereto, which, during a first operating cycle in the vicinity of the tabs can be moved a short distance both into the stack and in the direction of movement and which can be moved back into their starting position during a second operating cycle, and in that the fingers are if necessary subjected to preliminary tension by a spring in the direction of the stack.

It is advantageous if the distance covered by the fingers in the direction of movement is at least equal to the thickness of one index card, and preferably a plurality of index cards. The individual stacks are then clearly separated from one another. In addition, at least one index card can be moved whenever the fingers are moved.

It is advantageous if the fingers can be moved in synchronization with one another. In this way it is possible for the pressures to be always equal at all points.

It is advantageous if the fingers can be moved into the stack in synchronization with the return movement of the index card. In this way pressure at one end of the stack is always avoided when there is a risk of increased pressure there due to the return movement of an index card.

It is expedient if two groups of fingers are arranged on either side of the stack in a plane defined by the edges of the index card in the stack. The fingers can then engage on both sides of the stack and the index cards can thereby be moved more positively into a more parallel position to one another.

It is advantageous if each group of fingers is attached to a common rail or track. In this manner synchronization is simply ensured and the necessary movements do not need to be especially produced for each individual finger.

It is advantageous if the rail is guided by means of a slotted guide, the slots of which extend at an acute angle to the stack. In this simple manner it is possible for the fingers to move back and forth, in which case one of the movements can be effected by a spring or the like for the sake of simplicity.

It is advantageous if the fingers are laminated springs. In this way they bury themselves, so to speak, in the stack during their forward movement, but move easily over the stack during the return movement without any index cards being carried along with the fingers.

It is advantageous if the fingers are thin laminated springs which are supported by plates connected to the front of these springs when seen in the direction of movement. The fingers are thereby provided with sufficient preliminary tension in the direction of the stack. In spite of their relatively thin design they do not bend during the forward movement and are not prevented from moving easily past the stack on the return movement.

It is advantageous if the finger ends of both groups are on the same level. This makes it possible in practice for each pair of fingers to engage behind the same index card.

Other advantages and features of the invention are shown in the following description of a preferred practical embodiment.

Figure 1:
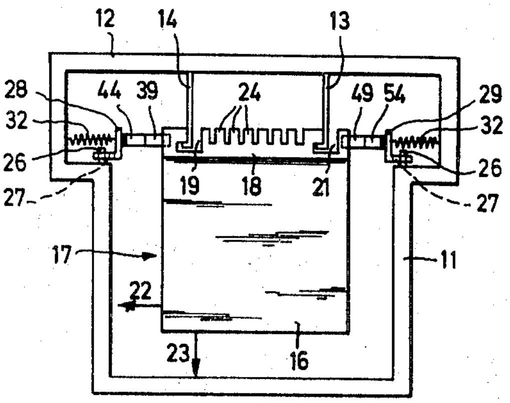
FIG. 1 shows a substantially simplified front view of a sheet storing medium.

The card-storing means comprises a lower support frame at 11, the upper section of which is rigidly connected to an upper frame 12. Spaced apart from one another are two L-shaped rails 13 and 14 which are rigidly connected to the upper frame 12. The base of the two L-shaped rails 13 and 14 extend in the same direction. A stack 17 consisting of a plurality of, for example, 1000 cards 16 of sheetlike form is suspended from these L-shaped rails 13 and 14. The upper edge of each card carries a tab 18 which is preferably made of spring steel and has two L-shaped recesses 19 and 21 at its ends.

These recesses are open edged and are of such a width in their vertical section that each card 16 can fall downwards out of the stack 17 if it is first moved by an unshown first transporting device in the direction of the arrow 22 and then in the direction of the arrow 23. Thus only the desired card is selected and moved out, the upper section of each tab 18 bearing a coding strip 24 by means of which a specific card 16 can be selected. Devices suitable for this purpose are described in German Pat. application No. P 15 49 947.5–27 or in German Pat. Specification Nos. 1,125,404 and 1,223,855.

The selected card 16 is carried by the second unshown transporting device to a reading, writing or checking station or the like. The same transporting device carries the card 16 back into the stack 17, particularly to the lower end of the stack 17 shown in FIG. 2.

Figure 2:
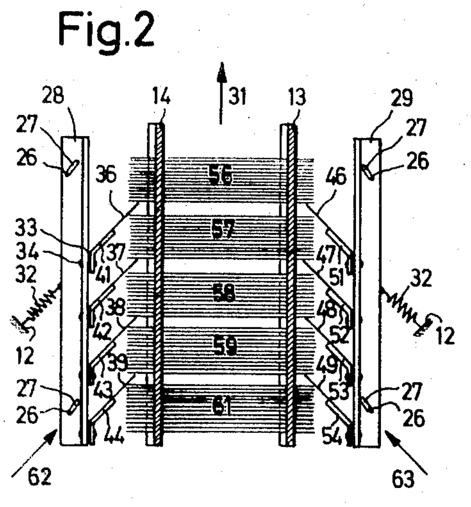
FIG. 2 shows a plan view of the sheet-storing medium with the support frame omitted.

Four upward projecting pins 26 are rigidly attached to the support frame 11. They penetrate slots 27 which are provided in the horizontal sides of angle irons 28 and 29. As can be seen in FIG. 2, these slots 27 extend at an acute angle to the direction of movement 31. The angle irons 28, 29 are shown in their operative position. Their inoperative position is such that the angle iron 28 is located further to the left and angle iron 29 further to the right of the indicated position in which the pins 26 are located at the other ends of the slots 27. The angle irons 28, 29 are held in this position by tension springs 32, the opposite ends of which are attached to the support frame 12. Equidistantly spaced laminated springs 36, 37, 38 and 39 are attached to the vertical side of the angle iron 28 on a level with and facing the tabs 18, the bases 33 of which are penetrated by rivets 34. Supporting bars 41, 42, 43, 44 are attached to the same rivets and engage on the sides of the laminated springs 36, 37, 38 and 39 which are directed away from the direction of movement 31.

Laminated springs 46, 47, 48 and 49 as well as supporting bars 51, 52, 53 and 54 are correspondingly attached to the angle iron 29.

Figure 3:
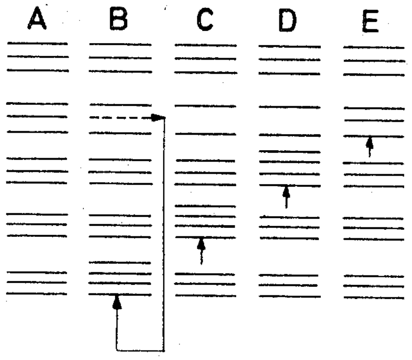
FIG. 3 shows a view of a simple working sequence.

The invention makes possible to form individual stacks 56, 57, 58, 59 and 61, which operation will be described below with the aid of FIGS. 2 and 3.

When the laminated springs 36–39 and 46–49 are brought from their inoperative position into the position shown, it is possible to form the individual stacks 56–61 as illustrated. This position is schematically represented in FIG. 3 by the column A. During operation of the device a card is removed from the individual stack 57 during the time span B, processed and then added to the individual stack 61, whereupon the latter increases in size as provided. Then the angle irons 28, 29 are moved in the direction of the arrows 62, 63 for the first time. As a result, the laminated springs 39, 49 grip the last card of the stack 61 pointing in the direction of the movement 31 and add this to the stack 59. The angle irons 28, 29 are moved back again and then the individual stack 59 is too large. During a second operative movement the final card in the stack 59 is added to the stack 58 and in a third operative movement the final card of the stack 58 is added to the stack 57, as illustrated in column E. It can be seen that the original position has now been reached, i.e., all the individual stacks 56–59 are identical in size.

Figure 4:
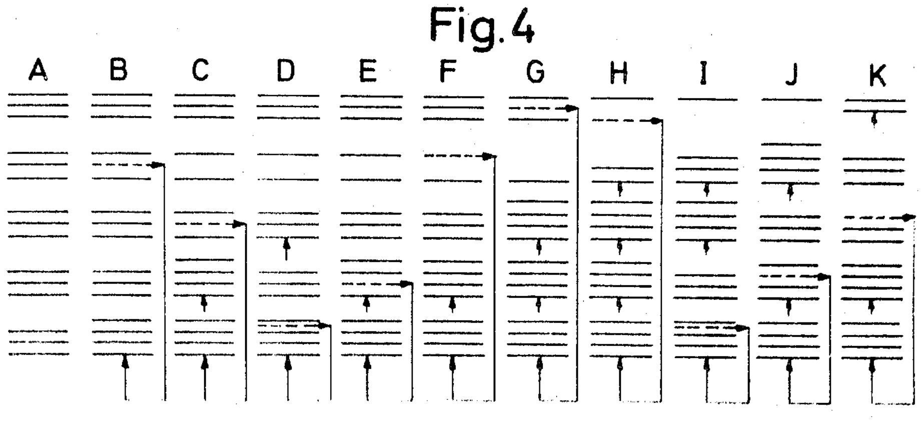
FIG. 4 shows a view of a more complicated working sequence.

The operation just described is considerably simplified in that it is naturally not necessary to wait until the time E to select a new card 16. Indeed selection of the cards overlaps with the movement of the angle irons 28 and 29. Such an operation is shown in FIG. 4. Moreover, the explanation is simplified in as much as the laminated springs do not always have to carry only one card. There can even be a plurality of cards or the left-hand laminated springs in a specific operative movement. On the other hand, the laminated springs on the left-hand side will statistically move as many cards 16 as the laminated springs on the right-hand side. FIG. 4 shows how the operations are performed in practice. Any card 16 is selected from one of the individual stacks at any of the times B–K. Whenever this card is added to the stack 61, an operative lifting movement of the angle irons 28, 29 is effected. The cards 16 to be removed are shown by broken lines. As can be seen in FIG. 4, the individual cards 56–61 are checked or inspected for a given amount of time and statistically are identical in size. It is of little importance if they are not identical in size for given amounts of time, since an individual stack consists of many cards 16. For example, if there are 1000 cards in the stack 17, 200 cards 16 are added to each individual stack. It does not matter whether such a stack consists of 195 or 205 cards.

What is claimed is:

1. In a device for selecting index cards of sheetlike form from a stack of index cards and transporting the index cards to a utilization station and therefrom towards one end of the stack, in which the stack is moved in the direction of the other end, said device comprising tab means extending along one edge of the index card, a rail means from which the tab means are suspended and along which they are slidably guided similar to a suspension file, the improvement comprising a plurality of fingers which are arranged at acute angles to and in the direction of movement of the stack, which fingers can be moved a short distance both into the stack and in the direction of movement during a first operative movement in the vicinity of the tab means and which can be moved back into their starting position during a second movement.

2. A device as claimed in claim 1 in which spring means subjects the fingers to a preliminary tension in the direction of the stack.

3. A device as claimed in claim 1, characterized in that the distance covered by the fingers in the direction of movement is at least equal to the thickness of one index card.

4. A device as claimed in claim 3 in which the distance is equal to a plurality of index cards.

5. A device as claimed in claim 1 in which the fingers can be moved in synchronization with one another.

6. A device as claimed in claim 5 in which the fingers can be moved in synchronization with the return movement of the index card into the stack.

7. A device as claimed in claim 1 in which two groups of fingers lie on both sides of the stack in a plane defined by the edges of the index cards in the stack.

8. A device as claimed in claim 7 in which both groups of fingers are attached to common rails respectively.

9. A device as claimed in claim 8 in which the rails are guided by means of a slotted guide, the slots of which extend at an acute angle to the stack.

10. A device as claimed in claim 1 in which the fingers are laminated springs.

11. A device as claimed in claim 10 in which the fingers are thin laminated springs which are supported by plates which engage on the sides thereof directed away from the direction of movement.

12. A device as claimed in claim 7 in which the ends of the fingers are on the same level in both groups.

* * * * *